July 23, 1946.　　　　L. M. POTTS　　　　2,404,654
TOLL METERING SYSTEM
Filed Feb. 7, 1942　　　　3 Sheets-Sheet 3

INVENTOR
LOUIS M. POTTS
BY  *H.B. Whitfield*
ATTORNEY

Patented July 23, 1946

2,404,654

UNITED STATES PATENT OFFICE 2,404,654

TOLL METERING SYSTEM

Louis M. Potts, Evanston, Ill., assignor to Teletype Corporation, Chicago, Ill., a corporation of Delaware Application February 7, 1942, Serial No. 429,874

19 Claims. (Cl. 178—2)

This invention relates to a toll meter system for recording toll charges in telephone or telegraph exchanges.

In telephone and telegraph practice, it is necessary to maintain accurate records of the toll calls made by the individual subscribers. It is customary to charge an initial rate usually for a three-minute period and then to charge an additional rate for each one minute period after the initial rate period has expired. The most common method employed for the recordation of toll call charges is to utilize an ordinary time stamp and manually stamp an impression upon a ticket at the commencement of a toll call and later to stamp a second impression upon the ticket when the toll call has been completed. Any other necessary information, such as the identity of the subscriber, is usually written in by hand, by the long distance operator.

By the present invention, a semi-automatic telegraph system is provided whereby the cost of telegraph or telephone toll calls may be automatically computed and printed in an accurate and efficient manner.

An object of the present invention is the provision of a semi-automatic telegraph system for the automatic computation and recordation of telephone and telegraph toll calls.

A further object of the present invention is to provide a toll recording system for telephone and telegraph exchanges having a plurality of rate charge circuits and means to select particular rate charge circuits and automatically register and compute the total cost of individual toll calls.

Another object of the present invention is to provide a toll recording system for telephone or telegraph exchanges whereby the cost for the initial rate period and a second rate period may be automatically computed.

A feature of the present invention is the provision of a master transmitter by means of which the charge for the initial rate period and the overtime period may be automatically registered.

Another feature of this invention is to provide a plurality of sequence switches which may be connected in circuit with a distributor in order to transmit telegraph signals to a printing telegraph apparatus.

Other objects and features of the invention will appear as the invention is described in more detail in the specification.

In carrying out the present invention, a master transmitter is employed for the purpose of registering the rate for the initial and overtime periods of a toll call. The master transmitter consists of a distributor having nine segmented rings, and a tenth ring consisting of a solid ring of conducting material. An additional impulsing segment is provided upon one of the segmented rings of the distributor.

The operator at a particular station in the exchange is provided with a plurality of pairs of keys representing different toll rates. One of the keys of each pair is operated upon the commencement of a toll call and the other key is operated upon the conclusion of the toll call. The result accomplished by the operation of these keys will be hereinafter described in more detail.

Three cables identifiable with the units, tens, and hundreds operations of the computing system are provided and are made up of nine wires each, with the individual wires of a particular cable connected to one of nine segmented rings of the master distributor. The wires connected to the first ring will be arranged to carry one impulse when this ring of segments is traversed by its associated brush during a single revolution. The wires connected to the second ring will be arranged to carry two impulses when this ring of segments is traversed by its associated brush, the next three impulses and so forth with respect to the other rings of the distributor. Any number up to and including nine impulses may be transmitted over an individual wire.

This master transmitter is common to a plurality of operators' stations in the exchange. It will be understood that although the invention is described in connection with a single rate circuit, a plurality of circuits may be employed by the present invention and individual operators will be able to connect with different rate circuits, all associated with the master transmitter at the exchange. Furthermore, it will be understood that the time intervals herein referred to are chosen only for the purpose of description and any other predetermined time intervals could be chosen.

The individual wires of the units, tens, and hundreds cables which are connected to the master transmitter are capable of being connected to a circuit extending to a registering device which is provided with units, tens, and hundreds sequence switches, so that when the individual wires are connected to this circuit, depending on the number of impulses received upon the individual wires from the master transmitter, the registering device is stepped off the proper number of positions representative of the initial rate charge. The invention provides that any number up to and including 999 may be registered upon the registering device.

By means of a counting relay system, and cam impulsing mechanism, a period of three minutes is allowed to elapse before a circuit representing a secondary or overtime charge is connected to the circuit of the sequence switches which are thereafter operated at one minute intervals by impulses received from the master transmitter, representative of the overtime charge. It is to be understood that it is not necessary to use all three of the units, tens, and hundreds wires at one time. For instance, if an initial or overtime charge was only eighty-five cents, then only one of the wires of the units cables and one of the wires of the tens cable would be connected in the circuit.

At the conclusion of the toll call, the operator is enabled, by means of one of the keys already referred to, to start into operation a telegraph transmitter which is connected with the sequence switches. Depending upon certain telegraph code combinations set up by the sequence switches, impulses are transmitted by the transmitter to a printer which automatically prints the charge of the toll call upon a ticket. The operator is provided with a keyboard transmitter and by means of a suitable switching arrangement may connect into the various rate circuits to transmit additional information to the printer for recordation upon the toll ticket.

This invention may be more readily understood by reference to the following description when taken in conjunction with the accompanying drawings, wherein.

Figure 1:
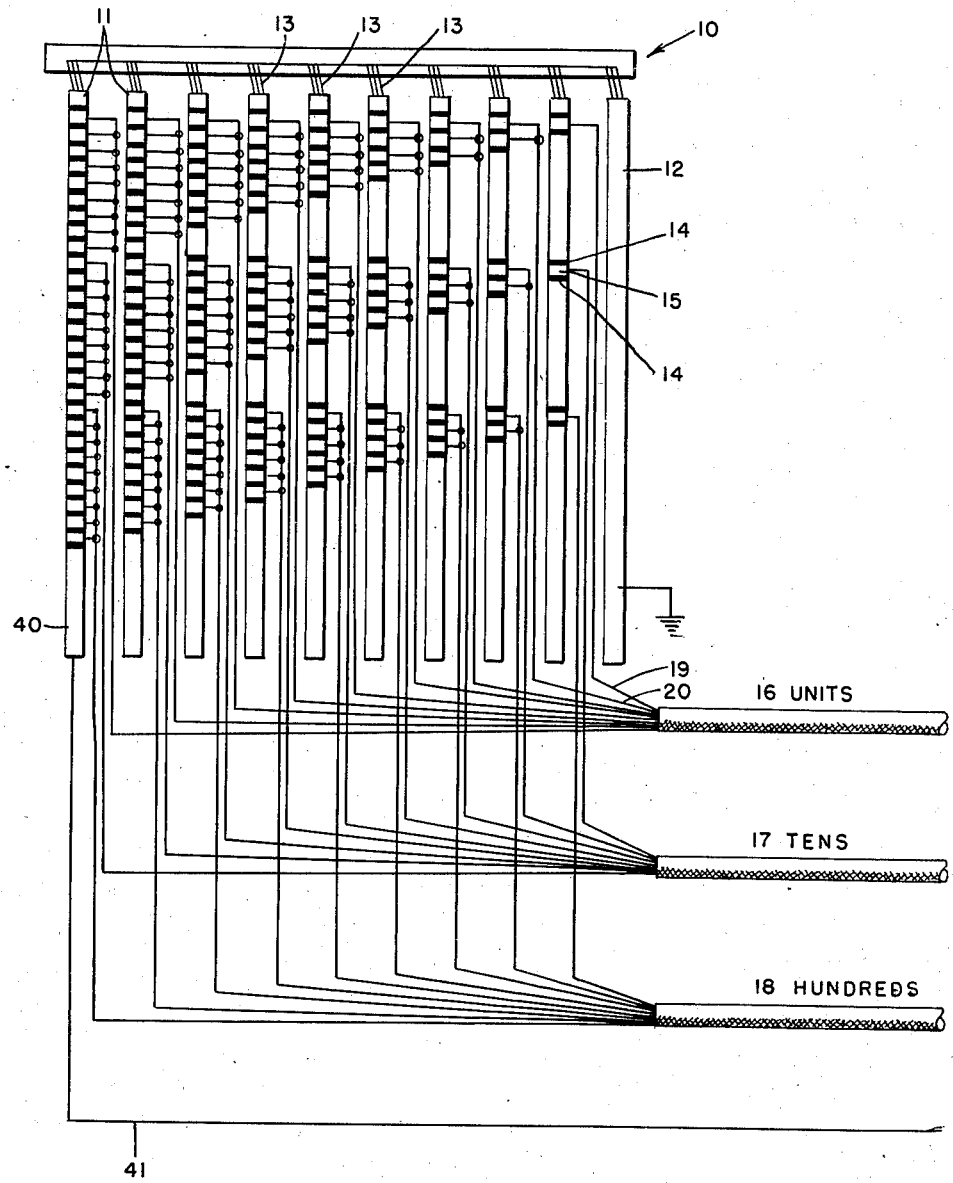
Fig. 1 is a schematic drawing of the master transmitter employed by the present invention.

Referring to the drawings, there is shown in Fig. 1 a master transmitter 10 which is made up of a plurality of segmented rings 11 and a solid ring of conducting material 12. Associated with each ring of segments and the solid conducting ring 12 are one of a plurality of brushes 13 which are all electrically connected and constantly rotate around the distributor. Each segmented ring is made up of alternate spaces of insulating material 14 and conducting material 15. It will be understood that the width of these insulated and conducting portions of the distributor will be so proportioned that the impulses of the proper duration will be generated by the transmitter when it is placed in operation. Connected to the conducting segments of the master transmitter are a plurality of wires leading from cables 16, 17, and 18 identified as the units, tens, and hundreds cable, respectively. By reference to the drawings it will be noted that the individual wires coming from the units cable 16 are connected to the segmented rings of the distributor so that one wire 19 goes to the first segmental ring at the right of Fig. 1 and is there connected to a single segment of conducting material. The next wire 20 goes to the next segmental ring of the master transmitter and it can be seen that this wire 20 branches into two wires, each connected to one of the conducting segments of this particular ring. The other wires leading from cable 16 in turn are connected to the segmental rings of the master transmitter and are progressively arranged so that the wires connected to the segmental row at the extreme left as viewed in Fig. 1, branches off to connect with nine conducting segments of this ring. The wires leading from the tens cable 17 and hundreds cable 18 are arranged in a similar manner to the wires leading from the cable 16. From the foregoing description, therefore, it is obvious that when the brushes 13 traverse the rings of segmental members in a single revolution, the segmental ring at the extreme right is capable of generating one impulse, the next ring will generate two impulses, and so forth until it will be observed that the segment at the extreme left side of Fig. 1 is arranged to generate nine impulses over each of the wires coming from cables 16, 17, and 18 of this particular segmental ring.

Figure 2:
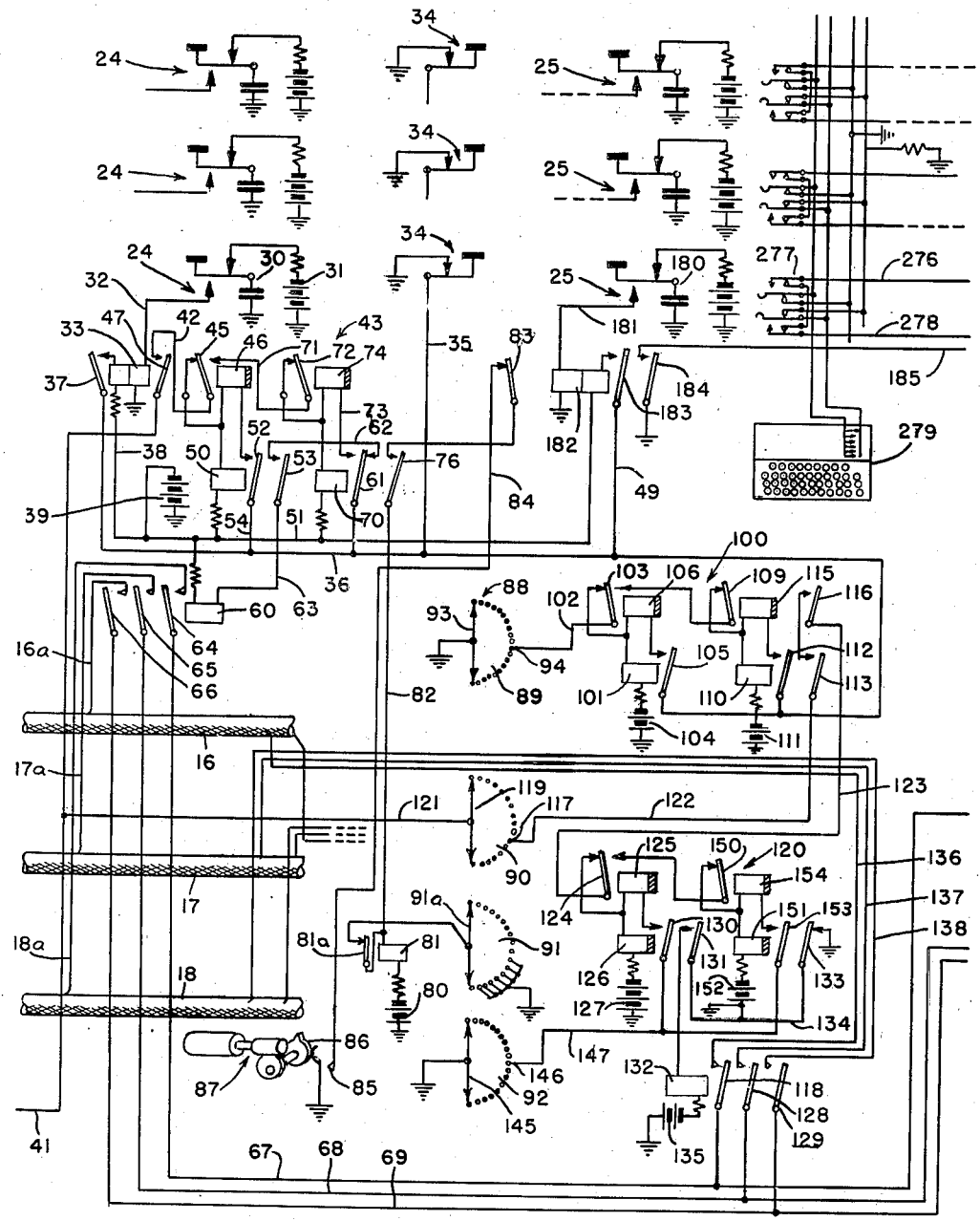
Fig. 2 is a circuit diagram for accomplishing certain of the switching operations performed by the present invention.

Referring to Fig. 2 there is disclosed therein a plurality of start keys 24 and a plurality of stop keys 25. Each pair of keys 24, 25 is associated with a different rate circuit, but for the purpose of explaining the present invention only a single rate circuit will be described in detail.

At the commencement of a toll call, the operator depresses a key 24 which controls a rate circuit which represents the charge for that particular toll call. Upon the depression of the key 24, current flows from the condenser 30, which has been charged by the battery 31, over the conductor 32, through the relay 33 which becomes energized, to ground. A locking circuit for relay 33 is established as follows: from ground through one of a plurality of restoration keys 34, over conductor 35, over conductor 36, through the armature 37 and locking winding of relay 33, over conductor 38, to battery 39. The restoration key 34 referred to in the present description will be one associated with the particular rate circuit chosen to illustrate the invention. It should be mentioned at this time, referring again to Fig. 1, that the segmental ring at the extreme left portion of Fig. 1 has connected therewith an additional impulsing segment 40 which, in turn, has connected thereto a conductor 41. When relay 33 became energized, the impulsing circuit over conductor 41 became extended through armature 47, now attracted by the relay 33, over conductor 42, to the counting relays 43.

It should be pointed out that the master transmitter 10 is continuously operating and during each of its revolutions is capable of transmitting signal impulses and also a special impulse by means of segment 40. When the brush of the master transmitter 10 passes over segment 40 during the first revolution after the closing of relay 33, an impulsing current can now be traced over the just described circuit, through armature 45 of relay 46, through relay 50 which now becomes energized, over conductor 51, to battery 39. When relay 50 becomes energized, it pulls up its armatures 52 and 53. A locking circuit is now prepared from ground, through restoration key 34, over conductors 35 and 36, through conductor 54, over the armature 52 of relay 50, thence through the winding of relay 46, through the winding of relay 50 and over the conductor 51 to battery 39. This last mentioned circuit is effective only when the brush of the master transmitter 10 leaves segment 40 and accordingly key 34 must be depressed long enough to permit this action. The impulsing circuit is carrying ground through the solid conducting ring 12, through the brushes 13, through the segment 40, and over the conductor 41, as far as, but not through, the winding 46, because at this time winding 46 is also receiving a ground potential through the restoration key 34 and over the conductor 35 as described. Therefore, as soon as the brush leaves the segment 40, current can now flow through the relays 46 and 50 as has been described. When armature 53 was attracted by relay 50, an energizing circuit was established for the relay 60, as follows: from ground, through restoration key 34, over conductor 35, over conductor 36, through armature 61, of relay 70, over conductor 62, through armature 53, over conductor 63, through the winding of relay 60, over conductor 51 to battery 39.

The energization of relay 60 allows it to pull up its armatures 64, 65, and 66. This connects conductors 16a, 17a, and 18a coming from each of the cables 16, 17, and 18, to conductors 67, 68, and 69, the wires connected being the particular ones representative of the initial rate charge for which this particular circuit was designed. This completes a circuit over the conductors 67, 68, and 69. The conductors 67, 68, and 69 lead to sequence register switches 160, 161, and 162 (Fig. 3) to be later described in more detail.

After the sequence switches have been stepped up to their respective positions representative of the initial rate charge upon receiving impulses from the master transmitter 10, segment 40 of the transmitter is again engaged by its respective brush and the impulsing circuit is now extended through armature 45 of relay 46, over conductor 71, through armature 72 of relay 74, through the relay 70, over conductor 51, to battery 39 thereby energizing relay 70. After the brush leaves the segment 40, a circuit becomes effective from ground through key 34, over conductors 35 and 36, through armature 61 of relay 70, over conductors 73, through relay 74 (which becomes energized), through relay 70, to battery 39.

The energization of relay 70 allows it to attract its armature 61 breaking the circuit to relay 60 to prevent a repeat operation of the sequence switches 160, 161, and 162 and further energization of relay 70 causes it to attract its armature 76 to establish a timing circuit which allows a call to be made over a three minute period at the initial rate which has been registered by the sequence switches 160, 161, and 162. The attraction of armature 76 by relay 70 establishes the timing circuit as follows: from battery 80, through the stepping magnet 81, over conductor 82, through armature 76, through armature 83 of relay 182, over conductor 84, to the contact 85. The contact 85 is designed to be closed at six second intervals by the constantly rotating cam 86 of the timing mechanism indicated generally at 87. This completes the ground circuit and causes the periodic stepping of the sequence switches 88, which comprise the four switches 89, 90, 91, and 92.

After the sequence switch 89 has been stepped to its tenth position by the intermittent operation of the stepping magnet 81 at six second intervals, a minute will have been tolled off by the sequence switches and the brush 93 will have reached the button contact 94 of the upper sequence switch 89. This will start into operation a set of counting relays 100. A circuit will be established by relay 101 as follows: from ground, through brush 93, through contact 94, over conductor 102, through armature 103, through the winding of relay 101, to battery 104.

When relay 101 becomes energized, it attracts its armature 105 which establishes a locking circuit for relay 101 from ground through restoration key 34, over conductor 35, over conductor 36, through armature 105 of relay 101 through relay 106 (which becomes energized), through relay 101, to battery 104. Sequence switch 91 is a zeroizing switch which is used to rapidly advance all of the sequence switches 88 through its connections with the stepping relay 81 to return the brushes of the sequence switches to their respective zero positions. In connection with this operation it should be noted that stepping relay 81 is provided with a vibrating contact 81a and that when brush 91a of zeroizing switch 91 reaches its tenth position ground is intermittently supplied to the relay 81 until the switches return to zero. The sequence switch 89 continues to operate for another one minute period when brush 93 again closes contact 94 and extends the circuit through armature 103 of relay 106, then through armature 109 of relay 115, through the winding of relay 110, to the battery 111. Relay 110 becomes energized and attracts its armature 112 and 113. A locking circuit is now prepared from ground, through key 34, over conductor 35, over conductor 36, through armature 112 of relay 110, through the relay 115, which becomes energized when brush 93 leaves button contact 94, through relay 110, to battery 111. When relay 115 is energized, it breaks the circuit extending through its armature 109 and attracts its armature 116, so that a circuit is prepared to a second set of counting relays 120.

After the sequence switches 88 have been stepped off for another or third one minute interval, brush 119 of sequence switch 90 is advanced to a position to close contact 117 which prepares a circuit from the impulsing segment 40 of the master transmitter, over conductors 41 and 121, through the brush 119, through contact 117, over conductor 122, through armature 113, through armature 116, over conductor 123, through armature 124 of relay 125, through relay 126, to battery 127. Thus, when the brush reaches the segment 40 of the master transmitter, relay 126 will be energized. When relay 126 is energized, it attracts its armatures 130 and 131. Relay 132 then becomes energized over the following circuit: from ground, through armature 133 of relay 151, over conductor 134, through armature 131, through the winding of relay 132, to battery 135. When relay 132 becomes energized, it attracts its armatures 118, 128, and 129, and this connects three conductors 136, 137, and 138 to the conductors 67, 68, and 69. The conductors 136, 137, and 138 come from the cables 16, 17, and 18 and represent the rate, which is connected to the master transmitter 10, which is to be charged for the overtime period after the initial rate period has elapsed. The conductors 136, 137, and 138, therefore, will now be connected in circuit with the sequence switches 160, 161, and 162 shown in Fig. 3 and will advance the sequence switches in accordance with the impulses transmitted over the individual wires 136, 137, and 138 from the master transmitter 10.

It must be kept in mind at this time that when the brush 119 of sequence switch 90 closed the contact 117 and permitted the next impulsing signal from the segment 40 of the master transmitter to energize relay 126, brush 145 of sequence switch 92 is in a position to close contact 146 so that a circuit is established from ground, through brush 145, through contact 146, over conductor 147, through armature 130, through relays 125 and 126, to battery 127. The master transmitter rotates several times during the six second interval that the sequence switches 88 are stepped to a new position and the sequence switch brushes therefore remain stationary for several seconds. This enables the next generated impulse transmitted from segment 40 of the master transmitter to be extended over the conductor 41, over the conductor 121, through the armature 124 of relay 125, through the armature 150 of relay 154, to relay 151, to battery 152. Relay 151 thus becomes energized and attracts its armatures 153 and 133. A circuit now extends from ground through brush 145 of sequence switch 92, through contact 146, over conductor 147, through armature 153 of relay 151, through relay 154, through relay 151, to battery 152. The attraction of armature 133 by the relay 151 causes the circuit to be broken to the relay 132 and prevents the repetition of a rate charge upon the sequence switches. The circuit through relay 132 is broken as the armature 133 of relay 151 pulls away from its grounded contact as relay 151 becomes energized.

When brush 145 of sequence switch 92 moves off of contact 146, the ground circuit to the counting relays 120 is broken and they become de-energized and ready for another operation. At one minute intervals thereafter, if the toll call is of such duration, the brush 119 will be stepped into position to close contact 117 which will cause a repetition of the operation which controls the overtime charge, and the sequence switches of the register mechanism will be advanced accordingly.

Figure 3:
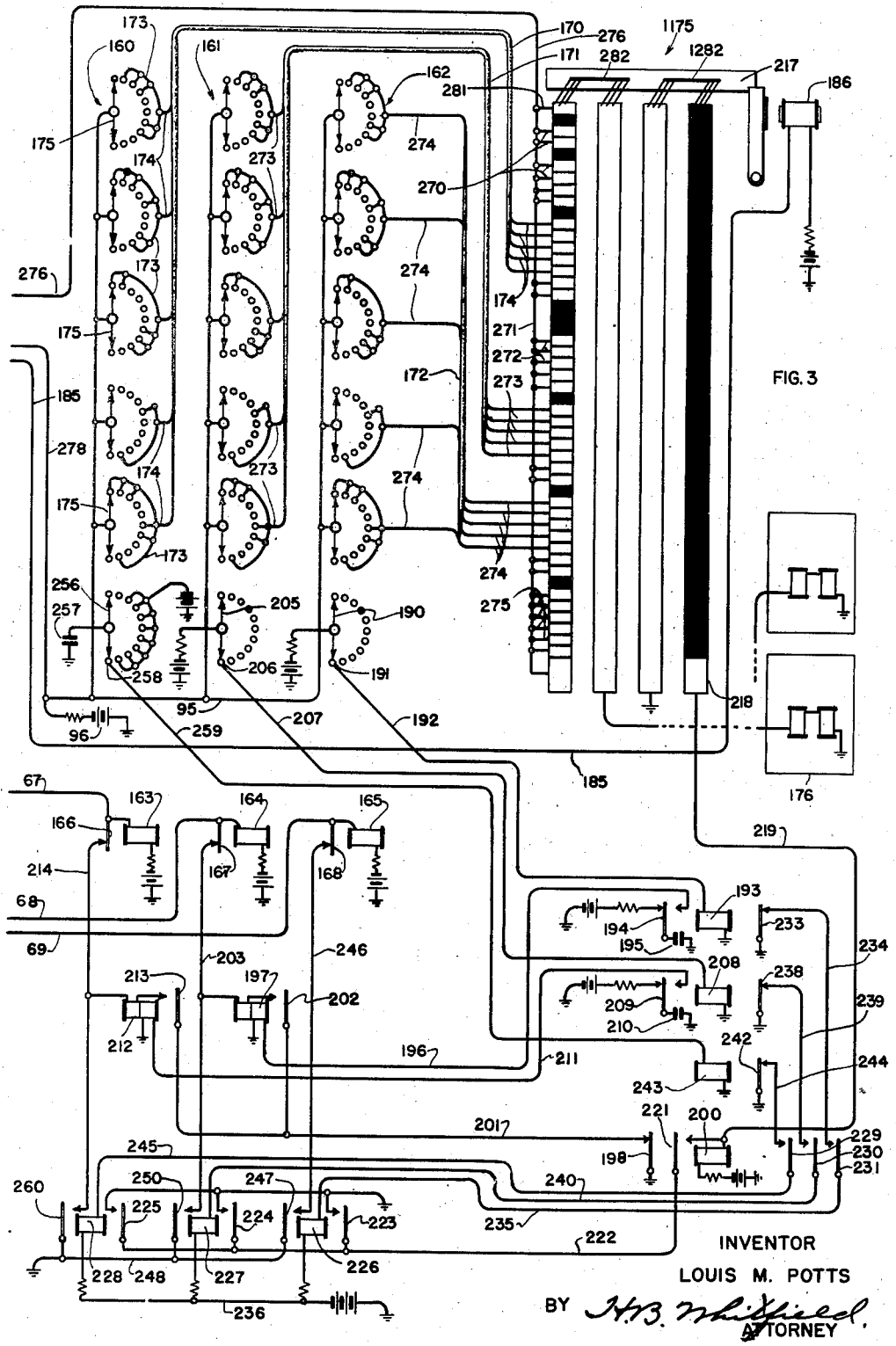
Fig. 3 is a circuit diagram including the sequence register switches, a transmitter, and a printing telegraph receiver.

Referring to Fig. 3, there is disclosed therein three sets of sequence register switches 160, 161, and 162. Sequence switch 162 records the units in the computing operation, sequence switch 161 records the tens in the computing operation, and sequence switch 160 records the hundreds in the computing operation. When impulses are transmitted over the conductors 67, 68, and 69, the stepping magnets 163, 164, and 165 are energized, the circuit being from the ground of the master transmitter 10 over the conductors 67, 68, and 69, and through the windings of magnets 163, 164, and 165 to the respective batteries of the stepping relays. The stepping magnets are provided with vibrating contacts 166, 167, and 168 so that as an impulse is received over the stepping relays, the sequence switches are stepped only one position at a time.

The sequence switches function as a translator and are arranged to carry telegraph signals employing the well-known Baudot start-stop code system. It will be understood, of course, that other telegraph code systems may be utilized without departing from the scope of the invention. Leading to the hundreds sequence switches 160 is a cable 170. Associated with the tens sequence switches 161 is a cable 171 and similarly there is provided a cable 172 which is associated with the units sequence switches 162. To illustrate this portion of the invention, the hundreds sequence switches 160 will be considered. It will be observed that bus bars 173 have connected thereto wires 174 extending from the cable 170. The other end of wires 174 are connected to certain segments of a master transmitter 1175. The different contacts of the sequence switches 160 are so connected to the bus bars 173 that as the brushes 175 are stepped to each of their positions, the proper code is set up which is capable of being transmitted over the transmitter 1175. For instance, in the Baudot code, the numeral "6" is composed of a marking, a spacing, a marking, a spacing, and a marking signal. Therefore, when the upper sequence switch of the sequence switches 160 occupies its sixth position, the contact at this point will be connected to the bus bar 173 and thus it will be possible to send a marking impulse over a wire 174. In the next lower sequence switch, when its brush 175 is in the number six position, the contact at this position is not connected to the bus bar 173, and therefore this particular switch is arranged to send a spacing impulse over a wire 174 when its brush is in its sixth position. The next lower sequence switch is adapted to send a marking impulse over a wire 174 when its brush is in its sixth position, the next lower sequence switch is adapted to send a spacing impulse over a wire 174 when its brush occupies the sixth position, and the lowermost sequence switch in the hundreds unit is arranged so that a marking impulse will be sent when its brush occupies its number six position. The units, tens, and hundreds sequence register switches, therefore, are arranged to set up different telegraph code combinations in accordance with the well-known Baudot system. The sequence switches receive battery over conductor 95 from battery 96.

Referring to the transmitter 1175, this transmitter will be arranged, as hereinafter described, so that the first set of signals transmitted will be the figures shift code combination which will operate to shift the case of the printer 176 to its figures position. The next set of signals to be transmitted will be the hundreds signal set up on the wires associated with cable 170. The next code combination will be the period code combination. The next code combination to be transmitted thereafter will be the tens combination carried by the wires connected with the cable 171. The next code combination to be transmitted immediately thereafter will be the units combination carried by the wires associated with the cable 172. Finally, the last code combination to be transmitted will be the letters shift code combination which will act to shift the printer 176 back to its letters case position.

The transmitter 1175 is set in operation when the operator depresses the stop key 25 shown in Fig. 2. The depression of key 25 establishes a circuit from the charged condenser 180 individual thereto, over conductor 181, through relay 182, to ground. The energization of relay 182 causes it to attract its armatures 83, 183, and 184. When relay 182 becomes energized, its attraction of armature 83 breaks the time impulsing circuit to the contacts 85. A locking circuit for relay 182 is established as follows: from battery 39, over conductor 51, through relay 182, through armature 183, over conductor 49, over conductor 36, then over conductor 35, to key 34, to ground. The energization of relay 182 also establishes the following circuit: from ground, through armature 184, over conductor 185, to the start magnet 186, to battery. The operation of the start magnet 186 allows the transmitter 1176 to begin transmission. The start magnet 186 acts in a well-known manner to accomplish the start of transmission from the transmitter 1175.

The carry-over circuit for the sequence register switches will now be explained. When the brush 190 reaches its zero position, a circuit will be made from battery, through contact 191, over conductor 192, through relay 193, which becomes energized and attracts its armature 194, to ground. This initiates a circuit from condenser 195, through armature 194, over conductor 196, through the winding of relay 197, to ground. This permits a circuit to be made from ground, over the armature 198 of relay 200, over conductor 201, through armature 202 which is now attracted by the relay 197, through the second winding of relay 197, over conductor 203, through the vibrating contact 167 of stepping magnet 164. This will allow the tens sequence switches 161 to be stepped up one position. In a similar manner, the sequence switches 160 are stepped up another position when a number is carried over from the tens switches to the hundreds switches, and this operation will now be explained. When the brush 205 reaches zero position in the tens sequence switches 161, a circuit is established from battery, through contact 206, over conductor 207, through relay 208, to ground. The energization of relay 208 allows it to pull up its armature 209 and a circuit is made from the condenser 210 over the conductor 211, to the relay 212, to ground. The energization of relay 212 allows it to attract its armature 213, and a circuit is established as follows: from ground, over armature 198 of relay 200, over conductor 201, through armature 213 of relay 212, through the second winding of relay 212, over the conductor 214, through the vibrating contacts 169 of the stepping magnet 163 to battery. This permits the hundreds sequence switches to be stepped forward one position.

When one of the wipers of the brushes 1282 of the transmitter 1175 traverses the segment 218, circuits are established for returning the sequence switches to their respective zero positions. A circuit is established from ground, through the brush 1282, over the segment 218, over conductor 219, through relay 200, to battery. The energization of relay 200 allows a locking circuit to be made from battery, through the winding of relay 200, over armature 221 (now attracted), over conductor 222, then branching off through the armatures 223, 224, and 225, of relays 226, 227, and 228, respectively to the grounds. These relays having become energized at this time due to the fact that when relay 200 attracts its armatures 229, 230, and 231, one circuit is made from ground, through armature 233 of relay 193, over conductor 234, through armature 231, over the conductor 235, through the winding of relay 226, over the conductor 236, to battery. A similar circuit is established from ground, over armature 238, over conductor 239, through the armature 230 of relay 200, over conductor 240, through the winding of relay 227, over the conductor 236, to battery. Another similar circuit is established from ground, over armature 242 of relay 243, over conductor 244, through the armature 229 of relay 200, over the conductor 245, through the winding of relay 228, over the conductor 236, to battery.

The relays 226, 227, and 228 are therefore at this time energized and circuits to the stepping magnets 163, 164, and 165 are established as follows: the circuit for stepping magnet 165 of the sequence switches 162 is traced from battery through the winding of relay 165 through the vibrating contact 168, over the conductor 246, through armature 247 of relay 226, over conductor 248, to ground. The brush of sequence switches 162 is stepped until it reaches the zero position wherein contact 191 is closed and a circuit is established as follows: from battery through brush 190, through contact 191, over conductor 192, through relay 193, to ground. Relay 193 is thus energized and attracts its armature 233 which breaks the ground connection for the relay 226, whose armature 247 then moves away and breaks the circuit to the stepping relay 165 which, therefore, remains at its zero position. Similarly, the sequence switches 161 are returned to their zero position as follows: as previously explained, the stepping magnet 164 is energized and when the brush 205 is stepped into its zero position a circuit is made as follows: from battery to brush 205, through contact 206, over conductor 207, through the winding of relay 208, to ground. The energization of relay 208 allows it to attract its armature 238 which breaks the ground circuit for relay 227 whose armature 250 then pulls away and breaks the circuit to the stepping magnet 164. In a similar manner, when brush 256 of the sequence switches 160 reaches its zero position, it makes a circuit from condenser 257 over brush 256 through contact 258, over conductor 259, through relay 243 which then becomes energized and attracts its armature 242 breaking the ground circuit to the relay 228 whose armature 260 then falls away and breaks the circuit to the stepping magnet 163. The sequence switches, therefore, are all returned to their original positions ready to perform another operation.

When the relays 226, 227, and 228 became deenergized their respective armatures 223, 224, and 225 were released and the locking circuit for the relay 200 was broken. It should be pointed out at this time that when relay 200 was energized during the zeroizing operation, armature 198 of relay 200 was attracted and, therefore, there was no danger of any carry over operations being performed during the zeroizing operation when relays 193 and 208 became energized inasmuch as the circuit for the zeroizing operation ordinarily extends through the armature 198 to ground.

Referring now to the master transmitter 1175 disclosed in Fig. 3, the operation of this transmitter will now be described in more detail. The transmitter has four rings, two of which are segmented as shown. Connected to the upper segments of the ring at the left of the master transmitter are a plurality of wires 270 which are all connected to a main conductor 271. The wires 270 are so connected to the transmitter that they represent the code combination of the figures shift operation by means of which the printer 176 will be shifted to its figures position. Next to be connected to the segments of the master transmitter are the lead wires 174 which are connected to cable 170 and represent the hundreds figure code combination which has been set up by the sequence switches 160. The next group of wires to be connected to the segments of the master transmitter are the wires 272 which are connected to the main conductor 271 and represent the period code combination which will be transmitted to the printer 176. The next group of wires to be connected to the segments of the master transmitter are the wires 273 which come from the cable 171 which carries the tens code combination which has been stepped up by the sequence switches 161. The next group of wires to be connected to the segments of the master transmitter are the wires 274 which are associated with cable 172 which represents the units code combination which has been set up by the sequence switches 162. The last group of wires to be connected to the segments of the master transmitter are the wires 275 which represent the letters shift code combination which is employed for shifting the printer 176 to its letters case or unshift position.

The wires 275 are in turn connected to the main conductor 271.

The main conductor 271 is connected with the conductor 276 and leads to the plug switch 277 (Fig. 2). Also associated with the plug switch 277 is a conductor 278 which is connected to battery 96 (Fig. 3). When the operator desires to transmit information to the printer 176 in order to add any necessary information to the toll ticket a plug is inserted in the plug switching contacts 277 and a circuit is established to the printer 176 as follows: from battery 96, over the conductor 278, through the plug switching contact 277, through the keyboard transmitter 279, over the conductor 276, over the main conductor 271, through the branch conductor 281 shown at the top of the transmitter segments. When transmission is taking place from the transmitter 1175, battery for the figures shift, the period and the unshift combination is furnished as follows: from battery 96 over conductor 278, through plug switch 277, over conductor 276 to the main conductor 271, and thence from the various branches of the segments of the transmitter, through the printer 176 to ground. The circuit for the units, tens, and hundreds cables extends from battery 96 over conductor 95 through the brushes of the sequence switches (provided the signal is marking), through cables 170, 171, and 172 through the segments of the master transmitter to the printer 176 and then to ground.

General operation

In order that the present invention may be readily understood, a typical toll charge operation will now be outlined. As has been previously stated, for each particular rate charge an operator is provided with a pair of keys 24, 25. At the beginning of the toll call, the operator depresses a key 24 which is identifiable with the rate being charged for the particular call. The depression of a key 24 energizes relay 33 which establishes a circuit to the counting relays 43 so that when the next impulse is transmitted over the conductor 41 as a brush 13 of the master transmitter 10 traverses the segment 40, relay 60 will become energized, which will connect three selected conductors 16a of the units cable 16, 17a of the tens cable 17 and conductor 18a of the hundreds cable 18; therefore, as the armatures 64, 65, and 66 are pulled up as relay 60 is energized, conductors 16a, 17a, and 18a will be connected in circuit with conductors 67, 68, and 69, respectively. Conductors 67, 68, and 69 are connected to the stepping magnets 163, 164, and 165, respectively. Thus, depending on the number of impulses which will be carried over the selected conductors 16a, 17a, and 18a when they receive impulses from the master transmitter 10, the sequence switches 160, 161, and 162 will be accordingly stepped up to positions representative of the initial rate charge.

When the next impulse is transmitted over the conductor 41 as the brushes of the master transmitter traverse the segment 40 during its next revolution, the counting relays 43 will so function that relay 70 will become energized breaking the circuit to the relay 60 to prevent a repeat operation of the sequence switches 160, 161, and 162, and at the same time closing its armature 76 so that the timing circuit will become effective to allow a three minute interval to elapse before a second or overtime rate circuit is selected.

When the timing circuit is made effective, the cam 86 of the timing mechanism 87 operates at six second intervals to energize the stepping magnet 81 of the sequence switches 88. When ten such impulses are transmitted, a minute interval will have expired and the brush 93 of the upper sequence switch 89 will be in a position to close contact 94 and thereby place a set of counting relays 100 into operation. The sequence switches 88 will then toll off another or second one minute interval, at the expiration of which time brush 93 of the upper sequence switch 89 will again be in a position to close the contact 94 and therefore extend the circuit of the counting relays 109 so that armature 116 is closed by the relay 115 and armatures 112 and 113 are closed by the relay 110. Sequence switches 88 will again function as before to toll off a third one minute interval. When this period has been tolled off, the brush 119 of the sequence switch 90 will be in a position to close the contact 117, which will enable the next generated impulse transmitted from segment 40 of the master transmitter 10 over conductors 41 and 121 to energize a set of counting relays 120 which enables the relay 132 to become energized and attract its armatures 118, 128, and 129. This connects conductor 136 of the unit cable, conductor 137 of the tens cable and conductor 138 of the hundreds cable to the conductors 67, 68, and 69, respectively. Conductors 136, 137, and 138 are identified with the overtime rate charge. Conductors 67, 68, and 69, are connected to the stepping magnets 163, 164, and 165 of the sequence switches 160, 161, and 162, respectively. Therefore, as the brushes of the master transmitter pass over the segmental rings, the impulses carried over the selected conductors 136, 137, and 138 will operate to energize the stepping magnets 163, 164, and 165, so that the sequence switches associated therewith are stepped up to positions representative of an overtime charge. This cycle of operations for the overtime rate will be repeated at one minute intervals thereafter if the toll call is of such duration. It must be borne in mind, that previously the initial rate charge was stepped up by the sequence switches so that, therefore, as the sequence switches are stepped up thereafter during the overtime rate period, an aggregate or cumulative registration of both the initial rate and the overtime rate charges is automatically computed by the sequence registering switches.

As hereinbefore explained in detail, the sequence switches 160, 161, and 162 are arranged in combinations in conformity with the well-known Baudot code and are associated with the transmitter 1175 in such a manner that when the transmitter 1175 is placed into operation, the aggregate or total charge registered by the sequence switches will be translated into telegraph code combinations.

At the completion of the toll call, the operator will depress the stop key 25 which is associated with the particular start key 24 representative of the toll call which has just been made. Depression of the key 25 energizes start magnet 186 and starts into operation the master transmitter 1175 which is connected with the printer 176. As the brushes 282 of the transmitter 1175 traverse the segments, first, a figures shift combination is sent to the printer 176, next, the hundreds code combination set up by the sequence switches 160 is sent. The next set of impulses to be transmitted by means of the wires 272 will represent the period code combination. The next set of impulses constitute the tens code combination, which has been set up by the registering switches 161 through the wires 273. The next set of impulses to be transmitted to the printer 176 will be the units code combination which has been set up by the sequence switches 162 which are connected by means of the conductors 274 to the transmitter 1175. The last set of code combinations to be sent to the printer 176 is the letters unshift code combination which is set up by the conductors 275 which are connected to the segments of the transmitter 1175. After the transmitter 1175 makes a single revolution segment 218 is traversed by the brushes 1282, the registering switches are returned to their zero positions as described, and the rotation of the transmitter is stopped.

At the end of a tolling operation, the operator may break the locking circuits for counting relays 43 and 100 by depressing the restoration key 34.

When the operator desires to send any additional information to the printer 176, a plug is inserted in the plug switching contacts 277 and a circuit is established from keyboard transmitter 279 to the printer 176 over conductors 276 and 278.

It is to be understood that various changes and modifications might be made in the present invention without departing from its spirit and scope.

What is claimed is:

1. In a toll metering system, a master transmitter including means to continuously generate impulses, selectable circuits connected with said transmitter each conducting a predetermined number of impulses from said transmitter corresponding to a selected digit, a plurality of sequence registering switches, stepping magnets for operating said switches, and rate circuit selecting means for connecting selected circuits to said stepping magnets to energize said magnets in accordance with the number of impulses transmitted over said selected circuits to thereby advance said sequence switches to positions representative of the rate circuit selected.

2. In a toll metering system, a transmitter including means to generate impulses, circuits connected with said transmitter capable of individually conducting a predetermined number of impulses and collectively a varying number of impulses, a registering device, rate circuit selecting means for initially connecting selected rate circuits to said registering device to operate said registering device in accordance with the number of impulses transmitted over the rate circuits selected, means for disconnecting said initially selected rate circuits and means to connect second rate circuits to said registering device to operate said registering device in accordance with the number of impulses transmitted over the second rate circuits selected, to enable said registering device to thereby compile an aggregate registry of both selecting operations.

3. In a toll metering system, a transmitter for continuously generating impulses, a rate charge circuit selectively connected to said transmitter capable of conducting a predetermined number of impulses from said transmitter, a registering device, means to connect said rate charge circuit to said registering device to operate said registering device in accordance with the number of impulses carried by said rate charge circuit.

4. In a toll metering system, a transmitter for generating impulses, an initial rate charge circuit connected to said transmitter conducting a predetermined number of impulses from said transmitter, a second rate charge circuit connected to said transmitter conducting a predetermined number of impulses from said transmitter, a registering device, means to connect said initial rate charge circuit to said registering device to operate said registering device in accordance with the number of impulses transmitted over said initial rate circuit, means to disconnect said initial rate circuit from said registering device, and means operable after a predetermined period of time has elapsed to connect said second rate charge circuit to said transmitter at timed intervals to operate said registering device in accordance with the number of impulses transmitted over said second rate circuit to thereby enable said registering device to compile an aggregate registry of both registering operations.

5. In a toll metering system, a transmitter including means to generate impulses, an initial rate circuit selectably connected with said transmitter for conducting a predetermined number of impulses from said transmitter, a second rate circuit connected with said transmitter conducting a predetermined number of impulses from said transmitter, a registering device, means to connect said initial rate circuit to said registering device, to operate said registering device in accordance with the number of impulses transmitted over said initial circuit, means to disconnect said initial circuit, and means operable after a predetermined time interval for connecting said second rate circuit to said registering device to operate said registering device in accordance with the number of impulses transmitted over said second circuit.

6. In a toll metering system, a transmitter including means to generate impulses, an initial rate circuit connected with said transmitter carrying a predetermined number of impulses from said transmitter, an overtime rate circuit carrying a predetermined number of impulses from said transmitter, a registering device, means to connect said initial rate circuit to said registering device to operate said registering device in accordance with the number of impulses transmitted over said initial circuit, means for disconnecting said initial circuit, and means operable after a predetermined time interval for periodically connecting said overtime rate circuits to said registering device to operate said registering device in accordance with the number of impulses transmitted over said initial circuit to thereby enable said registering device to compile an aggregate registration of the initial and overtime rate operations.

7. In a toll metering system, a transmitter including means to continuously generate impulses, circuits connected with said transmitter conducting impulses therefrom, a registering device, and circuit selecting means for connecting selected rate circuits to said registering device to operate said registering device according to the rate circuits selected.

8. In a toll metering system, a transmitter including means to continuously generate impulses, a rate circuit selectively connected with said transmitter for conducting impulses from said transmitter, a registering device, and means for connecting said rate circuit to said registering device to operate said registering device in accordance with the impulses transmitted over said rate circuit.

9. In a toll metering system, a transmitter including means to continuously generate impulses, a rate circuit connected with said transmitter conducting impulses characteristic of a selected digit, a registering device, means for connecting said rate circuit to said registering device to operate said registering device in accordance with the impulses transmitted over said rate circuit, translating means associated with said registering device for translating a registration into a telegraph code combination, a telegraph transmitter connected to said translating means, a telegraph printer connected with said telegraph transmitter, and means to operate said telegraph transmitter to thereby enable the recordation of information by said telegraph printer in accordance with the telegraph code combination established by said translating means.

10. In a toll metering system, including impulse generating means, an initial rate circuit connected with said impulse generating means for conducting impulses, a second rate circuit connected with said impulse generating means for conducting impulses, a registering meter, means to connect said initial rate circuit to said registering meter in accordance with the impulses transmitted over said initial rate circuit, means for disconnecting said initial rate circuit, and means operable after a predetermined time interval to connect said second rate circuit to said registering meter to operate said registering meter in accordance with the impulses transmitted over said second circuit to thereby enable said meter to register an aggregate registration of the initial and second rate operation.

11. In a toll metering system, including impulse generating means, an initial rate circuit connected with said impulse generating means for carrying predetermined signal impulses, a second rate circuit connected with said impulse generating means for carrying predetermined signal impulses, a registering meter, means to connect said initial rate circuit to said registering meter to operate said registering meter in accordance with the impulses transmitted over said initial rate circuit, means for disconnecting said initial circuit, and means operable after a predetermined time interval to connect said second rate circuit periodically to said registering meter to operate said registering meter in accordance with the impulses transmitted over said second circuit to thereby enable said meter to register an aggregate registration of the initial and second rate operation.

12. In a toll metering system, including impulse generating means, an initial rate circuit connected with said impulse generating means for conveying impulses therefrom, a second rate circuit connected with said impulse generating means for conveying impulses from said impulse generating means, a registering meter, means to connect said initial rate circuit to said registering meter to operate said registering meter in accordance with the impulses transmitted over said initial rate circuit, means for disconnecting said initial circuit, means operable after a predetermined time interval to connect said second rate circuit to said registering meter to operate said registering meter in accordance with the impulses transmitted over said second circuit to thereby enable said meter to register an aggregate registration of the initial and second rate operations, translating means associated with said registering device for translating an aggregate registration into a telegraph code combination, a telegraph transmitter connected to said translating means to transmit signals in accordance with the code combinations translated, a telegraph printer connected with said telegraph transmitter, and means to operate said telegraph transmitter to thereby operate said telegraph printer in accordance with the code combinations translated.

13. In a toll metering system, a transmitter including means to transmit impulses, an initial rate circuit connected with said transmitter for conducting impulses from said transmitter, a second rate circuit connected with said transmitter for conducting impulses from said transmitter, a registering device, means for connecting said initial rate circuit to said registering device to operate said registering device in accordance with the impulses transmitted over said initial rate circuit, means to disconnect said initial rate circuit, and means to connect said second rate circuit to said registering device to operate said registering device in accordance with the impulses transmitted over said second rate circuit to thereby enable said registering device to compile an aggregate registration of both registering operations.

14. In combination, a telegraph transmitter, a signal responsive means, said transmitter comprising a plurality of sets of continuously operating sets of number transmitting means, and means to select predetermined number transmitting means of each set to operate said signal responsive means according to the number transmitting means selected.

15. In a toll metering system, an impulse transmitter, a register, selectable rate circuits for connecting said transmitter with said register, means for selecting a desired rate circuit whereupon an impulse code combination exclusive to the rate circuit selected is transmitted from said transmitter to said register to cause to be set up in said register a charge equal to an initial rate, means for registering an overtime rate whereby said overtime rate is additive to the said initial rate to position the register to record a total toll charge, translating means including a telegraph transmitter associated with said register, a printer, and means for connecting said translating means and said printer to record the total charge registered.

16. In combination, manually operable means for selectively registering an initial toll charge, automatic means initiated by said manually operable means for additively registering an overtime toll charge whereby a total toll charge is registered, and translating means including a code transmitter for translating the registered total toll charge into recorded intelligence.

17. In a toll metering system, a master transmitter including means to continuously generate predetermined groups of impulses, circuits connected with said transmitter over which impulses from said transmitter are transmitted, a registering device, and means for selecting certain of said circuits and for connecting said selected circuits to said registering device whereby said registering device will be operated in accordance with the number of impulses generated by said transmitter and transmitted over the selected circuits.

18. In a toll metering system, means to generate impulses, a register, means to cause some of said impulses to be transmitted to said register corresponding to an initial and an overtime charge to be additively stored in said register, translating means to translate said stored impulses to permutation code signals, a transmitter, a printer, means to release said transmitter for one cycle of operation to transmit sode signals to said printer indicative of the total toll charge and to arrest said transmitter after the completion of said cycle of operation, a second transmitter, and means to connect said second transmitter to said printer through said first transmitter to transmit additional information to said printer when said first transmitter is in its arrested position.

19. In a toll metering system, a circuit, means to indefinitely transmit a continuous succession of identical signals on said circuit, a register, and means to connect said register to said circuit for the duration of one only of said signals whereby said register is operated during this period.

LOUIS M. POTTS.